(12) United States Patent
Müller et al.

(10) Patent No.: US 6,851,843 B2
(45) Date of Patent: Feb. 8, 2005

(54) LIGHT ASSEMBLY, ESPECIALLY SIGNAL LIGHT, FOR MOTOR VEHICLES

(75) Inventors: Otto Rolf Müller, Gruibingen (DE);
Stephan Berlitz, Schrobenhausen (DE);
Friedbert Schmitt, Esslingen (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 115 days.

(21) Appl. No.: 10/050,683

(22) Filed: Jan. 16, 2002

(65) Prior Publication Data

US 2002/0114166 A1 Aug. 22, 2002

(30) Foreign Application Priority Data

Jan. 18, 2001 (DE) .......................................... 201 00 918

(51) Int. Cl.⁷ ................................................ F21V 7/04
(52) U.S. Cl. ...................... 362/555; 362/545; 362/511; 362/310; 362/343; 362/247
(58) Field of Search ................. 362/555, 545, 362/511, 310, 343, 247, 541

(56) References Cited

U.S. PATENT DOCUMENTS

| | | | | |
|---|---|---|---|---|
| 5,184,883 A | * | 2/1993 | Finch et al. ................. | 362/511 |
| 6,107,916 A | * | 8/2000 | Beck et al. .................. | 340/468 |
| 6,286,984 B1 | * | 9/2001 | Berg ........................... | 362/505 |
| 6,450,656 B1 | * | 9/2002 | Noll ............................ | 362/23 |

* cited by examiner

Primary Examiner—Sandra O'Shea
Assistant Examiner—J. Tsidulko
(74) Attorney, Agent, or Firm—Gudrun E. Huckett

(57) ABSTRACT

A light assembly for a motor vehicle has a housing having a housing opening covered by a lens. At least one reflector is arranged in the housing, and at least one light guide is arranged in the housing between the at least one reflector and the lens. One or more LEDs as a light source are arranged hidden in the housing such that rays emitted by the LEDs are partially reflected on the at least one reflector toward the light guide. The light guide gives the impression of a fluorescent lamp being mounted in the light assembly.

14 Claims, 2 Drawing Sheets

LIGHT ASSEMBLY, ESPECIALLY SIGNAL LIGHT, FOR MOTOR VEHICLES

BACKGROUND OF THE INVENTION

1. Field of the Invention

The invention relates to a light assembly, especially a signal light, such as a taillight, for motor vehicles, wherein the light assembly comprises a housing whose housing opening is covered by a lens and in which housing at least one reflector as well as at least one light source are arranged.

2. Description of the Related Art

Taillights of motor vehicles are known which have a tubular fluorescent lamp used as a light source arranged in the housing of the light assembly. Such a fluorescent lamp is expensive and has a relatively short service life.

SUMMARY OF THE INVENTION

It is an object of the present invention to configure a light assembly of the aforementioned kind such that it can be manufactured inexpensively while providing a long service life.

In accordance with the present invention, this is achieved in that at least one LED is provided as a light source which is arranged in the housing so as to be hidden wherein the rays of the LED are reflected partially by a reflector to at least one light guide which is positioned in the area between the reflector and the lens.

The light assembly according to the invention has a light source in the form of at least one LED which has a long service life and can be produced inexpensively. The light guide provides the impression that a tubular fluorescent lamp is arranged within the light assembly. The light guide is however significantly less expensive than a tubular fluorescent lamp. The light assembly according to the invention can be used for all types of signal lights, for example, turn signal lights which are positioned in the forward area of the motor vehicle.

DESCRIPTION OF THE PREFERRED EMBODIMENTS

Figure 1:
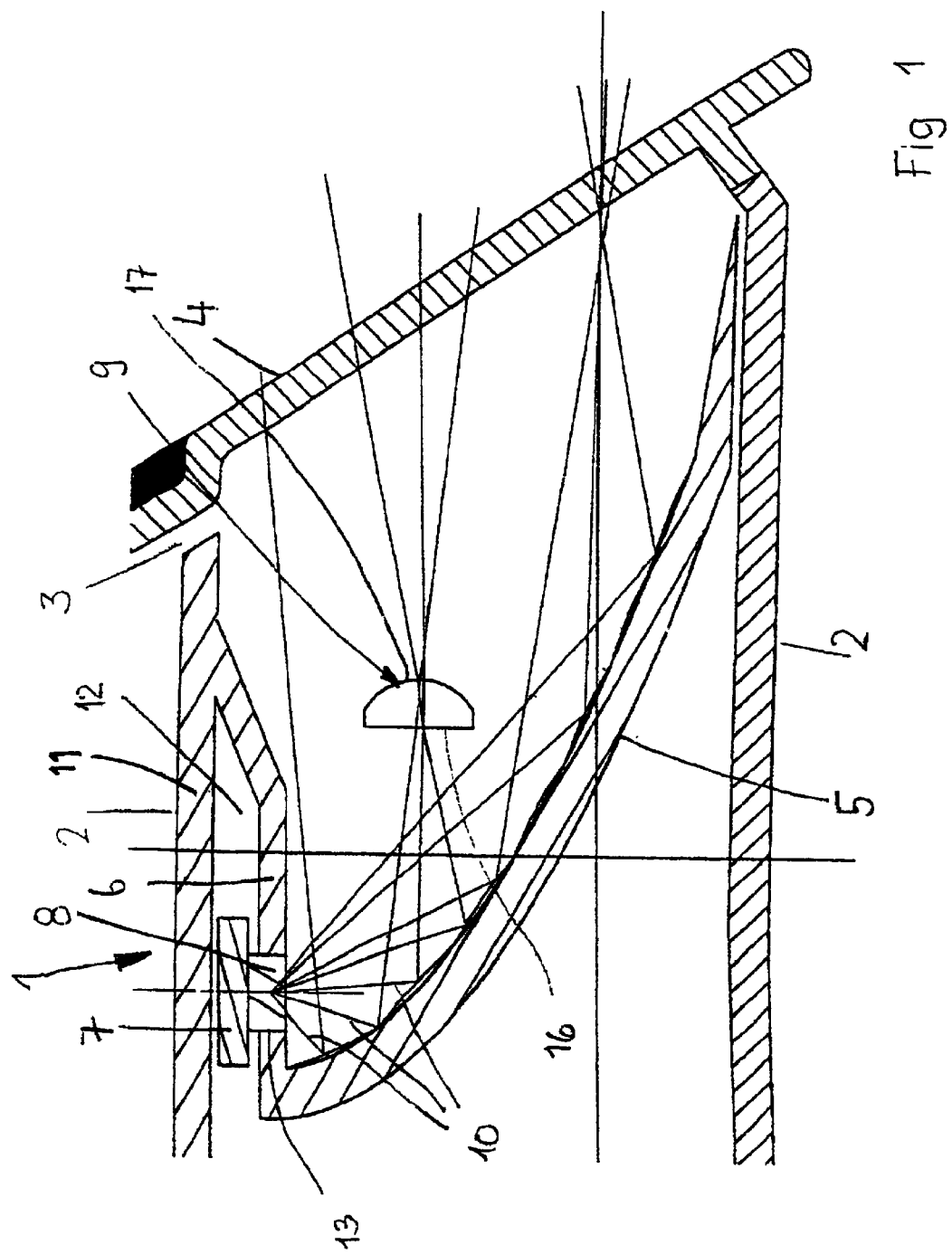
FIG. 1 shows a vertical section of a part of a light assembly according to the invention for a motor vehicle.

The taillight 1 illustrated in the drawings has a housing 2 which is illustrated only partially in FIG. 1. The housing opening 3 is covered by a lens 4, as is known in the art. Inside the housing 2, a reflector 5 is provided at a spacing behind the lens 4. The reflector 5 is formed as a monolithic part of the housing 2 in the illustrated embodiment; however, it can also be a separate component. Behind a housing wall 6 adjoining the reflector 5 a printed circuit board 7 is arranged. Preferably, several LEDs 8 are arranged sequentially in a row behind one another on the board 7. However, only one LED 8 is illustrated in FIG. 1.

Preferably, the LEDs 8 are SMD (surface mounted device) LEDs. The housing wall 6 adjoining the reflector 5 is surrounded at a spacing by the outer wall 11 of the housing 1. In this way, a receiving space or receptacle 12 for the printed circuit board 7 is formed between the two housing walls 6 and 11. Because of this arrangement, the printed circuit board 7 is no longer visible from the exterior. The LEDs 8 are positioned in openings 13 in the housing wall 6 and preferably do not project past the housing wall 6 in the direction toward the reflector 5. The light emitted by the LEDs 8 is reflected on the reflector 5 in the direction toward the lens 4, as indicated by the rays in FIG. 1. As a result of their hidden arrangement in the housing wall 6, the LEDs 8 are not visible through the lens 4 from the exterior.

Figure 2:
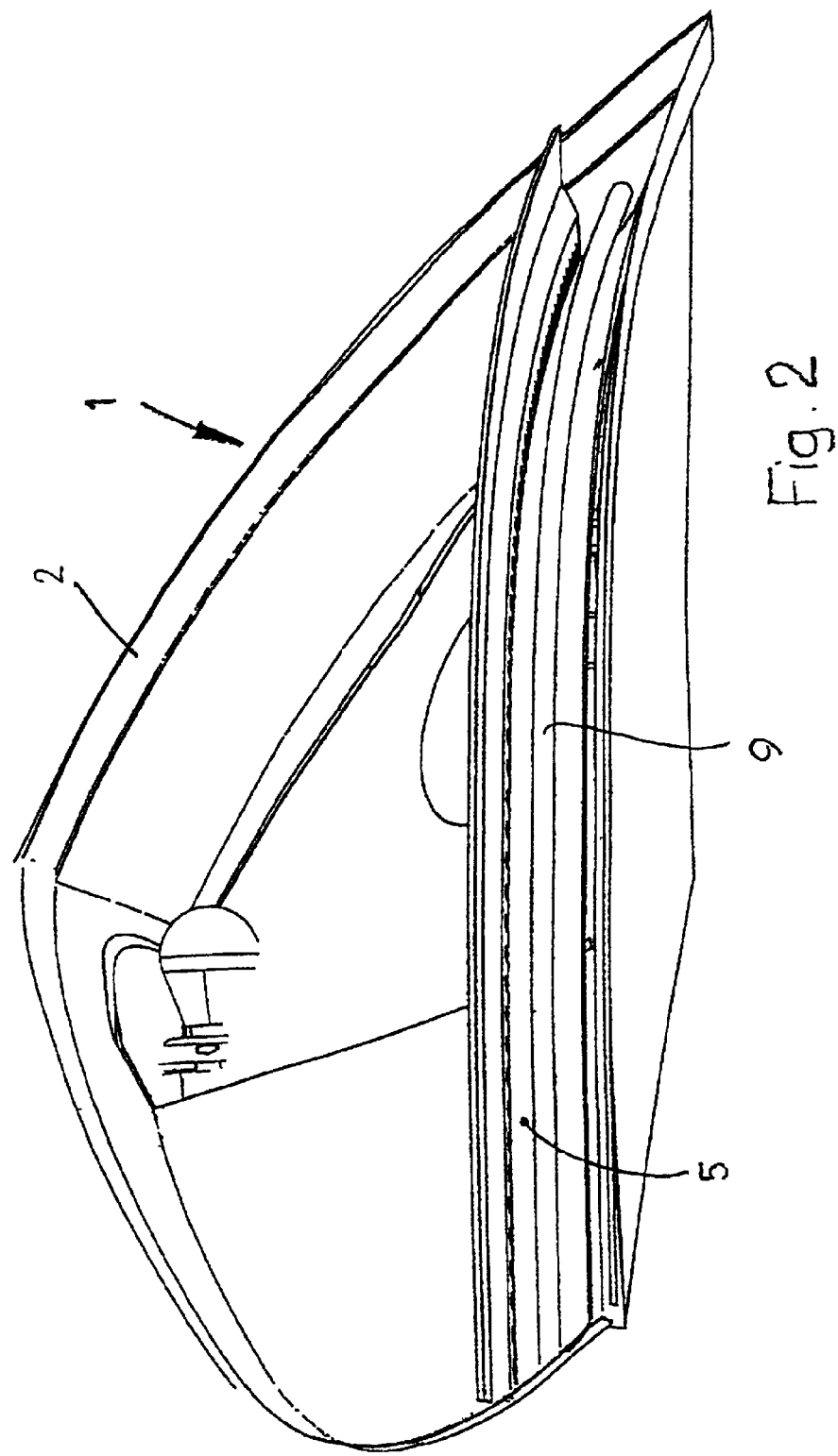
FIG. 2 is a view of the taillight without lens.

In the area between the reflector 5 and the lens 4, a light guide 9 is arranged which has a smaller spacing from the reflector 5 than from the lens 4 in the illustrated embodiment. However, the light guide 9 can also be positioned at the same spacing relative to the reflector 5 and the lens 4 or it can have a greater spacing from the reflector 5 than from the lens 4. The light guide 9 is rod-shaped and is comprised of PMMA (poly methyl methacrylate). It extends advantageously substantially over the entire length of the reflector 5. As shown in FIG. 2, the light guide 9 is curved across its length. Of course, the light guide 9, depending on the configuration of the light assembly 1, can have any other suitable shape. It is secured with both ends in a suitable way.

The back side 16 of the light guide 9 facing the reflector 5 is straight when viewing the light guide 9 in cross-section (FIG. 1); however, it can also be curved in cross-section. The front side 17 of the light guide 9 facing the lens 4 is convexly curved. The light guide 9 has only such a width that a portion of the light rays 10 emitted by the LEDs 8, after having been reflected on the reflector 5, pass the light guide 9 and directly impinge on the lens 4.

Another portion of the light rays 10 emitted by the LEDs 8 are reflected on the reflector 5 and impinge on the back side 16 of the light guide 9, pass through the light guide 9, and then impinge on the lens 4. Since the light guide 9 is rod-shaped and the rays, upon passing through the light guide 9, obtain a different color hue, a person looking onto the light assembly 1 from the exterior will see a band-shaped or rod-shaped light area. The person has the impression that a tubular fluorescent lamp is provided behind the lens 4. In order to enhance this impression, it is possible to introduce light into one end or both ends of the light guide 9. For this purpose, at one end and/or the other end of the light guide 9, a light source, preferably an LED, is arranged whose rays pass through the light guide 9. The front and/or back sides 16, 17 of the light guide 9 can be provided with optical elements such as lenses, profilings, or the like.

The LEDs 8 and the light guide 9 of the described light assembly 1 are suitable as a replacement for conventional expensive tubular fluorescent lamps. In this way, the light assembly 1 can be produced inexpensively and simply. The light assembly 1, as a result of the use of LEDs, has a long service life. Finally, the light assembly 1 is suitable for all kinds of signal lights such as, for example, front turn signal lights of passenger cars.

While specific embodiments of the invention have been shown and described in detail to illustrate the inventive principles, it will be understood that the invention may be embodied otherwise without departing from such principles.

What is claimed is:

1. A light assembly for a motor vehicle, the light assembly comprising:

a housing having a housing opening;

a lens covering the housing opening;

at least one reflector arranged in the housing;

at least one light guide arranged in the housing between the at least one reflector and the lens;

one or more LEDs as a light source arranged hidden from view in the housing such that rays emitted by the one or more LEDs are partially reflected on the at least one reflector directly toward the at least one light guide and partially reflected on the reflector so as to pass through the light guide before impinging on the lens so that the rays passing through the light guide provide a band-shaped or rod-shaped light area to a person looking at the light assembly.

2. The light assembly according to claim 1, wherein the housing has a receiving space and wherein the one or more LEDs are arranged in the receiving space.

3. The light assembly according to claim 2, further comprising a printed circuit board arranged in the housing, wherein several of the one or more LEDs are mounted on the printed circuit board sequentially in a row.

4. The light assembly according to claim 1, wherein the one or more LEDs are SMD (surface mounted device) LEDs.

5. The light assembly according to claim 1, wherein the at least one light guide is rod-shaped.

6. The light assembly according to claim 1, wherein the light assembly has a length and wherein the at least one light guide extends substantially across the entire length of the light assembly.

7. The light assembly according to claim 1, wherein the at least one light guide has a rod-shaped contour.

8. The light assembly according to claim 1, wherein the at least one light guide has a back side facing the at least one reflector and wherein the back side is straight when viewing the at least one light guide in cross-section.

9. The light assembly according to claim 1, wherein the at least one light guide has a back side facing the at least one reflector and wherein the back side is curved when viewing the at least one light guide in cross-section.

10. The light assembly according to claim 1, wherein the at least one light guide has a front side facing the lens and wherein the front side is convexly curved when viewing the at least one light guide in cross-section.

11. The light assembly according to claim 1, wherein the at least one light guide has two ends and wherein light is introduced into at least one of the two ends.

12. A light assembly for a motor vehicle, the light assembly comprising:

a housing having a housing opening;

a lens covering the housing opening;

at least one reflector arranged in the housing;

at least one light guide arranged in the housing between the at least one reflector and the lens;

one or more LEDs as a light source arranged hidden from view in the housing such that rays emitted by the one or mores LED are partially reflected on the at least one reflector toward the at least one light guide;

wherein the at least one light guide has a first spacing relative to the at least one reflector and a second spacing relative to the lens, wherein the first spacing is smaller than the second spacing.

13. A light assembly for a motor vehicle, the light assembly comprising:

a housing having a housing opening;

a lens covering the housing opening;

at least one reflector arranged in the housing;

at least one light guide arranged in the housing between the at least one reflector and the lens;

one or more LEDs as a light source arranged hidden from view in the housing such that rays emitted by the one or mores LED are partially reflected on the at least one reflector toward the at least one light guide;

wherein the at least one light guide has a front side and a back side, wherein at least one of the front and back sides has optical elements.

14. The light assembly according to claim 13, wherein the optical elements are lenses or profilings.

\* \* \* \* \*